US009838401B2

(12) United States Patent
Wang et al.

(10) Patent No.: US 9,838,401 B2
(45) Date of Patent: Dec. 5, 2017

(54) METHOD, CLIENT TERMINAL DEVICE AND SYSTEM FOR VERIFYING PAGE INFORMATION

(71) Applicant: TENCENT TECHNOLOGY (SHENZHEN) COMPANY LIMITED, Shenzhen (CN)

(72) Inventors: Haibo Wang, Shenzhen (CN); Gucai Luo, Shenzhen (CN); Xuyang Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 217 days.

(21) Appl. No.: 14/733,704

(22) Filed: Jun. 8, 2015

(65) Prior Publication Data

US 2015/0271186 A1    Sep. 24, 2015

Related U.S. Application Data

(63) Continuation of application No. PCT/CN2013/086726, filed on Nov. 8, 2013.

(30) Foreign Application Priority Data

Dec. 10, 2012 (CN) .......................... 2012 1 0527762

(51) Int. Cl.
*G06F 21/00* (2013.01)
*H04L 29/06* (2006.01)
*H04L 29/08* (2006.01)

(52) U.S. Cl.
CPC ........ *H04L 63/123* (2013.01); *H04L 63/1483* (2013.01); *H04L 63/168* (2013.01); *H04L 67/02* (2013.01)

(58) Field of Classification Search
CPC . H04L 63/123; H04L 63/1483; H04L 63/168; H04L 67/02
See application file for complete search history.

(56) References Cited

U.S. PATENT DOCUMENTS

| 6,105,012 A * | 8/2000 | Chang | .................... G06Q 20/00 380/277 |
| 6,393,420 B1 * | 5/2002 | Peters | .................. G06Q 10/087 |

(Continued)

FOREIGN PATENT DOCUMENTS

| CN | 101860540 A | 10/2010 |
| CN | 102110198 | * 6/2011 |
| CN | 102110198 A | 6/2011 |

OTHER PUBLICATIONS

International Search Report for International Application No. PCT/CN2013/086726, dated Feb. 27, 2014.

(Continued)

*Primary Examiner* — Lisa Lewis
(74) *Attorney, Agent, or Firm* — Knobbe Martens Olson & Bear LLP

(57) ABSTRACT

Examples of the present disclosure provide a method, client terminal device and system for verifying page information, the method includes: verification decryption information of real verification information of each of pages to be verified is obtained from a verification information server; real verification information of a page to be browsed by a user is obtained by decrypting the verification decryption information; and risk warning information is displayed when the real verification information of the page to be browsed by the user differs from actual verification information of the page to be browsed by the user. Technical solutions of the present disclosure may verify the page to be browsed after the page is obtained, and when it is determined after the verification that there is a risk, risk warning information may be dis- (Continued)

played on the client terminal. Thus the reliability of network security may be increased.

17 Claims, 6 Drawing Sheets

(56) References Cited

U.S. PATENT DOCUMENTS

| | | | | |
|---|---|---|---|---|
| 8,099,605 | B1* | 1/2012 | Billsrom | G06F 11/1448 713/187 |
| 2004/0054779 | A1* | 3/2004 | Takeshima | G06F 17/30569 709/225 |
| 2006/0126468 | A1* | 6/2006 | McGovern | G06F 21/64 369/53.1 |

OTHER PUBLICATIONS

International Preliminary Report on Patentability for International Application No. PCT/CN2013/086726 dated Jun. 25, 2015, 7 pages.
Office Action Issued in Chinese Application No. 201210527762.8 dated May 12, 2017, 8 pages.

* cited by examiner

METHOD, CLIENT TERMINAL DEVICE AND SYSTEM FOR VERIFYING PAGE INFORMATION

CROSS-REFERENCE TO RELATED APPLICATIONS

This application is continuation of International Application No. PCT/CN2013/086726, filed on Nov. 8, 2013, which claims the benefit of Chinese Patent Application No. 201210527762.8, filed on Dec. 10, 2012, the disclosures of which are incorporated by reference herein in their entireties.

FIELD

The present disclosure relates to Internet technologies, and more particularly, to a method, client terminal device and system for verifying page information.

BACKGROUND

During the process of transmitting page data from an Internet server to a client terminal, the page data is often maliciously attacked, for instance, a page may be modified or a potential safety hazard may be inserted in the page, which results in insecurity of user information. Especially, a log-in page related to an account is often attacked. Once the user inputs an account and a password in the log-in page, the account and the password may be stolen.

In the prior art, a Hypertext Transfer Protocol over Secure Socket Layer (HTTPS) channel taking the security as the target is configured to perform secure Hypertext transfer protocol (HTTP) data transmission. Different from the HTTP, the HTTPS has a default port and an encryption/identity verification layer (between the HTTP and TCP), and provides an identity verification and encryption communication method. By using the HTTPS, information security may be ensured in transaction and payment.

However, the HTTPS is not widely used. Security verification is not performed on many pages. Once a user inputs personal information in an attacked page, the personal information may be stolen by a malicious attacker, which leads to low reliability of network security.

SUMMARY

According to examples of the present disclosure, a method, client terminal device and system for verifying page information is provided to display risk warning information in a client terminal device when it is determined after a verification that a page has a risk, and improve the reliability of network security.

The method for verifying page information provided by an example of the present disclosure includes: obtaining verification decryption information of real verification information of each of pages to be verified from a verification information server; obtaining real verification information of a page to be browsed by a user by decrypting the verification decryption information; wherein the page to be browsed by the user is obtained from a web server; and displaying risk warning information when the real verification information of the page to be browsed by the user differs from actual verification information of the page to be browsed by the user.

The client terminal device for verifying page information provided by an example of the present disclosure includes: an obtaining unit, configured to obtain verification decryption information of real verification information of each of pages to be verified from a verification information server; a decrypting unit, configured to obtain real verification information of a page to be browsed by a user by decrypting the verification decryption information obtained by the obtaining unit; wherein the page to be browsed by the user is obtained from a web server; and a displaying unit, configured to display risk warning information when the real verification information, obtained by the decrypting unit, of the page to be browsed by the user differs from actual verification information of the page to be browsed by the user.

The system for verifying page information provided by an example of the present disclosure includes: a web server, configured to generate verification decryption information of real verification information of each of pages to be verified; a verification information server, configured to obtain verification decryption information of real verification information of each of pages to be verified from the web server, and store obtained verification decryption information of real verification information of each of pages to be verified; and a client terminal, configured to obtain the verification decryption information of real verification information of each of pages to be verified from the verification information server; obtain real verification information of a page to be browsed by a user by decrypting the verification decryption information; display risk warning information when the real verification information of the page to be browsed by the user differs from actual verification information of the page to be browsed by the user; wherein the page to be browsed by the user is obtained from the web server.

As can be seen from the above technical solutions of the present disclosure, verification decryption information of real verification information of each of pages to be verified may be obtained from a verification information server, real verification information of the page to be browsed by the user may be obtained by decrypting verification decryption information, and risk warning information may be displayed when the real verification information of the page to be browsed by the user differs from actual verification information of the page to be browsed by the user. Compared with the conventional scheme that many webpages have no security verification, the technical solution provide by the example of the present disclosure may verify the page to be browsed after the client terminal obtains the page, and when determining after the verification that there is a risk, display risk warning information on the client terminal. Thus the reliability of network security may be increased.

BRIEF DESCRIPTION OF THE DRAWINGS

Features of the present disclosure are illustrated by way of examples and not limited in the following figures, in which like numerals indicate like elements, in which.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples. As used herein, the term "includes" means includes but not limited to, the term "including" means including but not limited to. The term "based on" means based at least in part on. In addition, the terms "a" and "an" are intended to denote at least one of a particular element.

Figure 1:
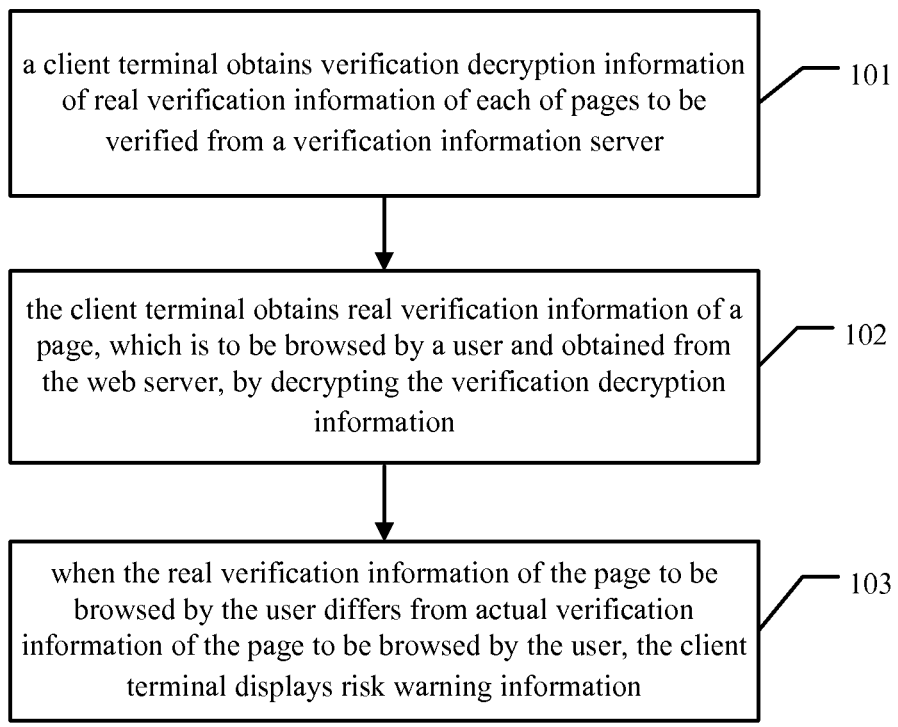
FIG. 1 is a flow diagram illustrating a method for verifying page information based on an example of the present disclosure.

FIG. 1 is a flow diagram illustrating a method for verifying page information based on an example of the present disclosure. As shown in FIG. 1, the method may include the following processes.

In block 101, a client terminal obtains verification decryption information of real verification information of each of pages to be verified from a verification information server.

In the example of the present disclosure, the verification information server may obtain and store verification decryption information, generated by a web server, of real verification information of each page among all pages to be verified from the web server.

The web server is also known as the World Wide Web (WWW) server, and is configured to provide online information browsing service.

The user may access the web server through a browser of a client terminal, and may obtain online information from the web server.

Because not every webpage of webpages provided by the web server is protected by the HTTPS, many webpages may be attacked by a Trojan horse in the process of transmission from the web server to the client terminal, which results in a page which is transmitted to the client terminal at risk.

In general, a webpage address may be a Uniform/Universal Resource Locator (URL).

The verification decryption information may be searched out and decrypted to obtain real verification information.

In block 102, the client terminal obtains real verification information of a page, which is to be browsed by a user and obtained from the web server, by decrypting the verification decryption information.

The verification decryption information of the example of the present disclosure may include a URL, a name of a signature field of page content, a storage location of the signature field and a public key for decrypting a signature, of every page of pages to be verified.

The relationship among above mentioned several parameters may be expressed in a form, such as the form of table 1.

TABLE 1

| verification decryption information of pages to be verified | | | |
| --- | --- | --- | --- |
| URL | storage location of the signature field | name of the signature field of page content | public key for decrypting a signature |

The client terminal may, according to the URL of the page to be browsed by the user, search out the name of the signature field, the storage location of the signature field and the public key; obtain a signature corresponding to the name of the signature field from the storage location of the signature field; decrypt the signature using the public key, and obtain real verification information of the page to be browsed by the user.

It can be interpreted as that the client terminal includes a browser module bearing browser program and a verification module bearing verification program capable of achieving the verification function described in the example of the present disclosure. The client terminal may obtain the page to be browsed by the user from the web server through the browser module, and perform the verification described in example of the present disclosure through the verification module, after the verification module obtains the page to be browsed by the user form the browser module.

In block 103, when the real verification information of the page to be browsed by the user differs from actual verification information of the page to be browsed by the user, the client terminal displays risk warning information.

In the example of the present disclosure, verification decryption information of real verification information of each of pages to be verified may be obtained from a verification information server, real verification information of the page to be browsed by the user may be obtained by decrypting verification decryption information, and risk warning information may be displayed when the real verification information of the page to be browsed by the user differs from actual verification information of the page to be browsed by the user. Compared with the conventional scheme that many webpages have no security verification, the technical solution provide by the example of the present disclosure may verify the page to be browsed after the client terminal obtains the page, and when determining after the verification that there is a risk, display risk warning information on the client terminal Thus the reliability of network security may be increased.

Optionally, based on the example shown in FIG. 1, in another example of the present disclosure, before the process of obtaining real verification information of a page, which is to be browsed by a user and obtained from the web server, by decrypting the verification decryption information, the method for verifying page information may further include: determining that the page to be browsed by the user is a page to be verified.

In the example of the present disclosure, when the page to be browsed by the user is a page to be verified, the verification procedure in the example shown in FIG. 1 is performed. When the page to be browsed by the user is not a page to be verified, it is not necessary to perform the verification procedure in the example shown in FIG. 1. Therefore, it is possible to determine whether the page to be browsed by the user is a page to be verified before the verification.

Optionally, based on the example shown in FIG. 1, in another example of the present disclosure, the verification decryption information includes URLs of all pages to be verified.

The process of determining the page to be browsed by the user is a page to be verified may include the followings.

URLs of all pages to be verified are searched for a URL of the page to be browsed by the user; when the URL of the page to be browsed by the user is searched out, it is determined that the page to be browsed by the user is a page to be verified.

In the example of the present disclosure, since the client terminal has obtained verification decryption information of real verification information of each of pages to be verified from the verification information server in block 101, and the verification decryption information includes URLs of all pages to be verified, the client terminal stores the URLs of all pages to be verified, and the client terminal may search the URLs of all pages to be verified for the URL of the page to be browsed by the user, and when the URL of the page to be browsed by the user is searched out, it indicates that the page to be browsed by the user needs to be verified. When no URL of the page to be browsed by the user is searched out, it indicates that verification is not necessary for the page to be browsed by the user.

Optionally, based on the example shown in FIG. 1, in another example of the present disclosure, the verification decryption information may a URL, a name of a signature field of page content, a storage location of the signature field and a public key for decrypting a signature, of each of pages to be verified.

The process of obtaining real verification information of a page to be browsed by a user by decrypting the verification decryption information may include the followings.

According to the URL of the page to be browsed by the user, the name of the signature field, the storage location of the signature field and the public key for decrypting a signature, of the page to be browsed by the user may be searched out. A signature corresponding to the name of the signature field is obtained from the storage location of the signature field. The signature is decrypted using the public key, and real verification information of the page to be browsed by the user is obtained.

In the example of the present disclosure, as shown in FIG. 1, the name of a signature field of page content, the storage location of the signature field and the public key for decrypting a signature, which are corresponding to the URL of the page to be browsed by the user, may be searched out according to the URL of the page to be browsed by the user.

When generating the verification decryption information, the web server may generate a signature using an asymmetric cryptographic algorithm and a private key.

The client terminal may obtain the signature corresponding to the name of the signature field from the storage location of the signature field, decrypt the signature using the public key, and obtain real verification information of the page to be browsed by the user.

Optionally, based on the example shown in FIG. 1 and above mentioned optional examples, in another example of the present disclosure, before the process of determining that the real verification information of the page to be browsed by the user differs from actual verification information of the page to be browsed by the user, the method for verifying page information may further include: comparing the real verification information of the page to be browsed by the user with actual verification information of the page to be browsed by the user. Specifically, the comparison may be performed by the client terminal, or by other special comparison device.

Optionally, based on the example shown in FIG. 1 and above mentioned optional examples, in another example of the present disclosure, the real verification information includes a real hash value of page content of the page to be browsed by the user.

The process of comparing the real verification information of the page to be browsed by the user with actual verification information of the page to be browsed by the user may include the followings.

An actual hash value of page content of the page to be browsed by the user is calculated. The real hash value of page content of the page to be browsed by the user is compared with the actual hash value of page content of the page to be browsed by the user.

Optionally, based on the example shown in FIG. 1 and above mentioned optional examples, in another example of the present disclosure, the real verification information includes a real hash value of compressed page content of the page to be browsed by the user.

The process of comparing the real verification information of the page to be browsed by the user with actual verification information of the page to be browsed by the user may include the followings.

An actual hash value of compressed page content of the page to be browsed by the user is calculated. The real hash value of compressed page content of the page to be browsed by the user is compared with the actual hash value of compressed page content of the page to be browsed by the user.

Optionally, based on the example shown in FIG. 1 and above mentioned optional examples, in another example of the present disclosure, the method for verifying page information may further include: when the real verification information of the page to be browsed by the user is the same as actual verification information of the page to be browsed by the user, a security prompt is displayed.

Figure 2:
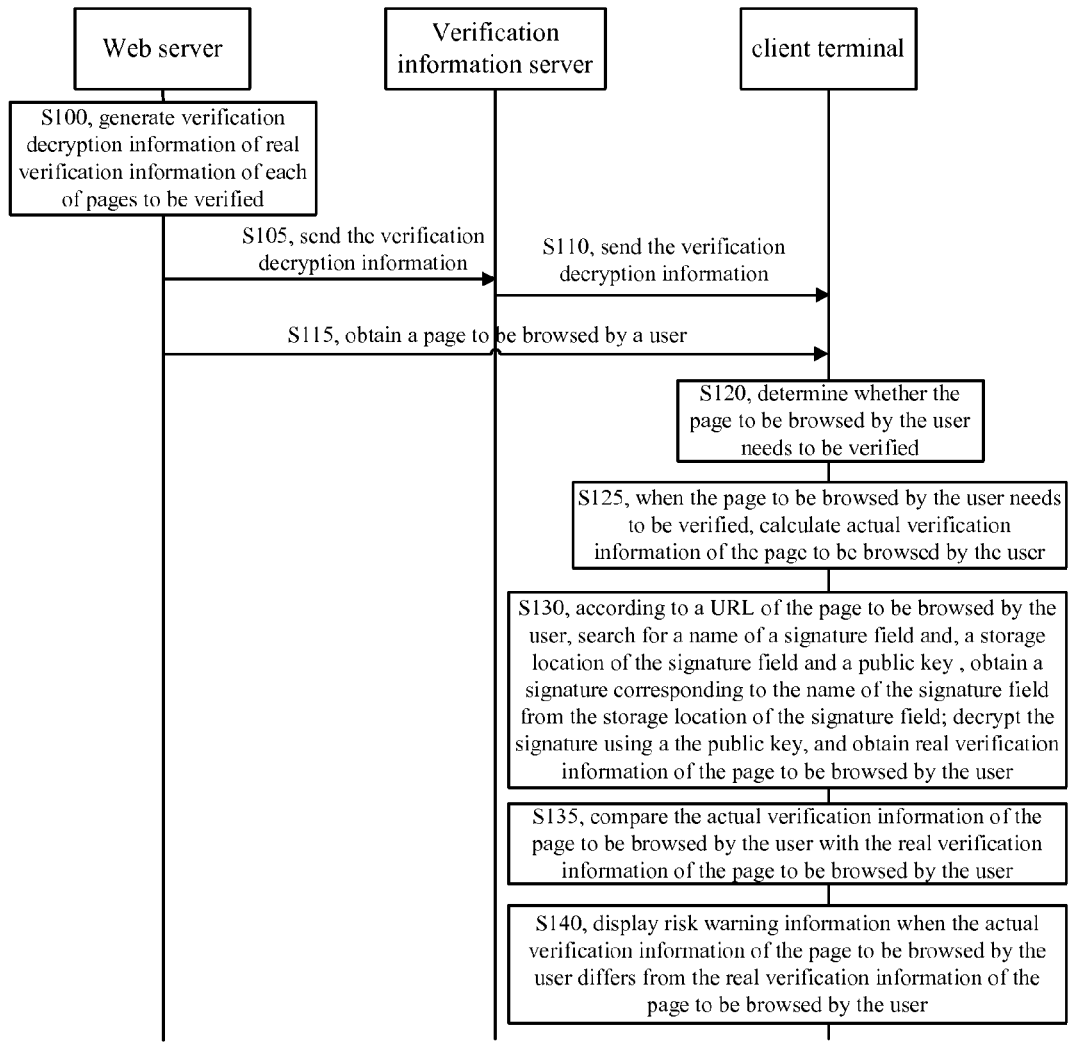
FIG. 2 is a flow diagram illustrating a procedure for verifying page information in an application scene based on an example of the present disclosure.

An application scene is taken as an example for describing the verification procedure. FIG. 2 is a flow diagram illustrating the procedure for verifying page information in the application scene based on an example of the present disclosure. As shown in FIG. 2, the method may include the following processes.

In step S100, a web server generates verification decryption information of real verification information of each of pages to be verified.

The verification decryption information includes a URL, a name of a signature field of page content, a storage location of the signature field and a public key which is used to decrypt a signature of every page of pages to be verified.

The signatures generated by the web server may be divided into two categories, which are respectively non-compressed signature and compressed signature.

The process for generating a non-compressed signature may include the followings. Page content of a page to be verified is calculated using the Message-Digest Algorithm 5

(MD5) or the Secure Hash Algorithm (SHA), and a real hash value of the page content of the page to be verified is obtained. Asymmetric encryption is performed on the real hash value using a private key, and a signature is obtained. The signature occupies a section of the memory, the hexadecimal conversion is performed on content of the section of the memory, and an American Standard Code for Information Interchange (ASCII) character is obtained.

The process for generating a compressed signature may include the followings. Page content of a page to be verified is compressed, and compressed page content is obtained. The compressed page content is calculated using the MD5 or the SHA, and a real hash value of compressed page content of the page to be verified is obtained. Asymmetric encryption is performed on the real hash value using a private key, and another signature is obtained. Another signature occupies a section of the memory, the hexadecimal conversion is performed on content of the section of the memory, and another American Standard Code for Information Interchange (ASCII) character is obtained.

A name is assigned to the signature, namely the name of the signature field, the name of the signature field and the signature may be stored in a URL, a HTTP header, or a cookie. Thus, the storage location of the signature may be the URL, the HTTP header, or the cookie.

When the name of the signature field and the signature is stored in the URL, the signature information may be http://xxxxxxxxxx?B=A. When the name of the signature field and the signature is stored in the HTTP header, B in above mentioned URL may be the name of the header, and A in above mentioned URL may be the corresponding value. When the name of the signature field and the signature is stored in the cookie, B in above mentioned URL may be the index key, and A in above mentioned URL may be the value.

As can be seen, it is not necessary to develop and maintain the web server, and it is possible to generate a signature using a hash value and an asymmetric cryptographic algorithm, and put the signature in the URL or the HTTP header, and send verification information to the verification information server.

In order to improve the efficiency, an arrangement that all web servers use the same hash algorithm (such as MD5, SHA, or other algorithms) and the same asymmetric cryptographic algorithm (such as ECC, RSA, or other algorithms) may be made.

In block 105, the web server sends the verification decryption information of real verification information of each of pages to be verified to a verification information server.

The verification information server is only configured to store the verification decryption information of real verification information of each of pages to be verified, and sends the verification decryption information of real verification information of each of pages to be verified to a client terminal.

In block S110, a client terminal obtains the verification decryption information of real verification information of each of pages to be verified from the verification information server.

In block S115, the client terminal obtains from the web server a page to be browsed by a user.

The client terminal may obtain page content of the page to be browsed by the user from the web server according to a URL of the page to be browsed by the user.

It can be interpreted as that the client terminal bears browser program capable of achieving a browser and verification program capable of achieving the verification function described in the examples of the present disclosure. The client terminal may obtain the page to be browsed by the user from the web server through the browser program, and perform the verification described in example of the present disclosure through the verification program, after the page to be browsed by the user is obtained.

In block S120, the client terminal determines whether the page to be browsed by the user needs to be verified.

The client terminal determines whether the page to be browsed by the user needs to be verified may include the followings. The client terminal may search URLs of all pages to be verified for the URL of the page to be browsed by the user, and when the URL of the page to be browsed by the user is searched out, the client terminal determines that the page to be browsed by the user needs to be verified. When the URL of the page to be browsed by the user is not searched out, the client terminal determines that verification is not necessary for the page to be browsed by the user.

In block S125, when determining that the page to be browsed by the user needs to be verified, the client terminal calculates actual verification information of the page to be browsed by the user.

In the example of the present disclosure, the client terminal calculates actual verification information of the page to be browsed by the user may include the followings. The client terminal may determine whether page content of the page to be browsed by the user is compressed. When the page content of the page to be browsed by the user is non-compressed, the client terminal may calculate an actual hash value of the page content of the page to be browsed by the user. When the page content of the page to be browsed by the user is compressed, the client terminal may calculate an actual hash value of compressed page content of the page to be browsed by the user.

In block S130, the client terminal, according to a URL of the page to be browsed by the user, searches for a name of a signature field, a storage location of the signature field and a public key for decrypting a signature, and obtains a signature corresponding to the name of the signature field from the storage location of the signature field; decrypts the signature using the public key, and obtains real verification information of the page to be browsed by the user.

In block S135, the client terminal compares the actual verification information of the page to be browsed by the user with the real verification information of the page to be browsed by the user.

In the example of the present disclosure, when page content of the page to be browsed by the user is non-compressed, a real hash value of page content of the page to be browsed by the user may be compared with an actual hash value of page content of the page to be browsed by the user to determine whether the real hash value of page content is the same as the actual hash value of page content. When page content of the page to be browsed by the user is compressed, a real hash value of compressed page content of the page to be browsed by the user may be compared with an actual hash value of compressed page content of the page to be browsed by the user to determine whether the real hash value of compressed page content is the same as the actual hash value of compressed page content.

In block S140, when determining that the actual verification information of the page to be browsed by the user differs from the real verification information of the page to be browsed by the user after the comparison, the client terminal displays risk warning information.

In the example of the present disclosure, when determining after the comparison that the actual hash value of page content of the page to be browsed by the user differs from the real hash value of page content of the page to be browsed by the user, or the actual hash value of compressed page content of the page to be browsed by the user differs from the real hash value of compressed page content of the page to be browsed by the user, the client terminal may display risk warning information.

Optionally, in the present application scene, the method for verifying page information may further include: when determining after the comparison that the actual hash value of page content of the page to be browsed by the user is the same as the real hash value of page content of the page to be browsed by the user, or the actual hash value of compressed page content of the page to be browsed by the user is the same as the real hash value of compressed page content of the page to be browsed by the user, the client terminal may display a security prompt.

Figure 3:
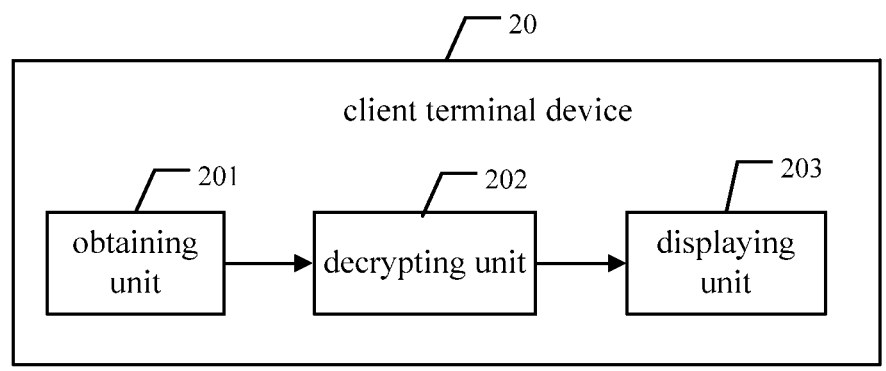
FIG. 3 is a schematic diagram illustrating a client terminal device for verifying page information based on an example of the present disclosure.

FIG. 3 is a schematic diagram illustrating a client terminal device for verifying page information based on an example of the present disclosure. As shown in FIG. 3, the client terminal device may include an obtaining unit 201, a decrypting unit 202 and a displaying unit 203.

The obtaining unit 201 is configured to obtain verification decryption information of real verification information of each of pages to be verified from a verification information server.

The decrypting unit 202 is configured to obtain real verification information of a page, which is to be browsed by a user and obtained from a web server, by decrypting the verification decryption information obtained by the obtaining unit 201.

The displaying unit 203 is configured to display risk warning information when the real verification information, obtained by the decrypting unit 202, of the page to be browsed by the user differs from actual verification information of the page to be browsed by the user.

In the example of the present disclosure, the obtaining unit 201 obtains verification decryption information of real verification information of each of pages to be verified from a verification information server, the decrypting unit 202 obtains real verification information of a page, which is to be browsed by a user and obtained from a web server, by decrypting the verification decryption information obtained by the obtaining unit 201; the displaying unit 203 displays risk warning information when the real verification information, obtained by the decrypting unit 202, of the page to be browsed by the user differs from actual verification information of the page to be browsed by the user. Compared with conventional technologies, the client terminal device of the present disclosure may verify the page to be browsed after obtaining the page, and when determining after the verification that there is a risk, display risk warning information on the client terminal. Thus the reliability of network security may be increased.

Figure 4:
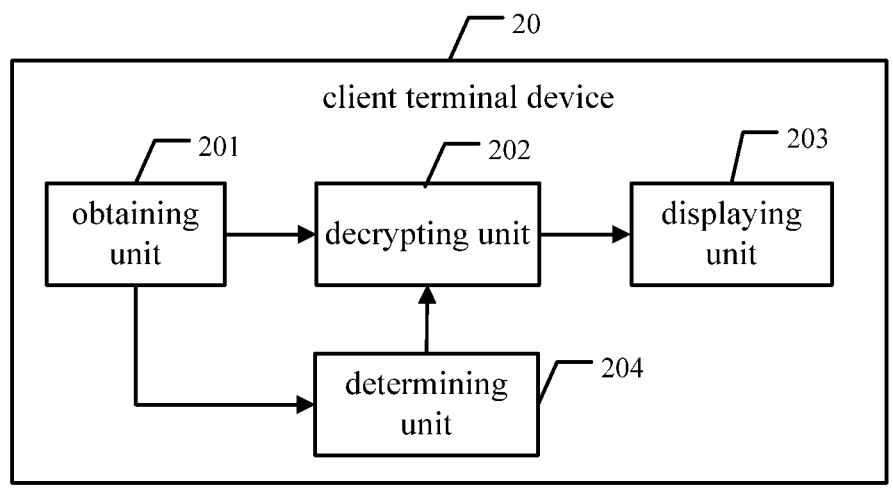
FIG. 4 is a schematic diagram illustrating a client terminal device for verifying page information based on another example of the present disclosure.

Based on the example of the client terminal device shown in FIG. 3, another example of the client terminal device of the present disclosure is shown in FIG. 4, and the client terminal device shown in FIG. 4 may further include a determining unit 204.

The determining unit 204 is configured to, before the decrypting unit 202 obtains the real verification information of the page to be browsed by the user, determine that the page to be browsed by the user is a page to be verified.

Based on the example of the client terminal device shown in FIG. 4, in another example of the client terminal device of the present disclosure, the verification decryption information includes URLs of all pages to be verified.

The determining unit 204 may search the URLs of all pages to be verified for a URL of the page to be browsed by the user; when the URL of the page to be browsed by the user is searched out, determine that the page to be browsed by the user is a page to be verified.

Figure 5:
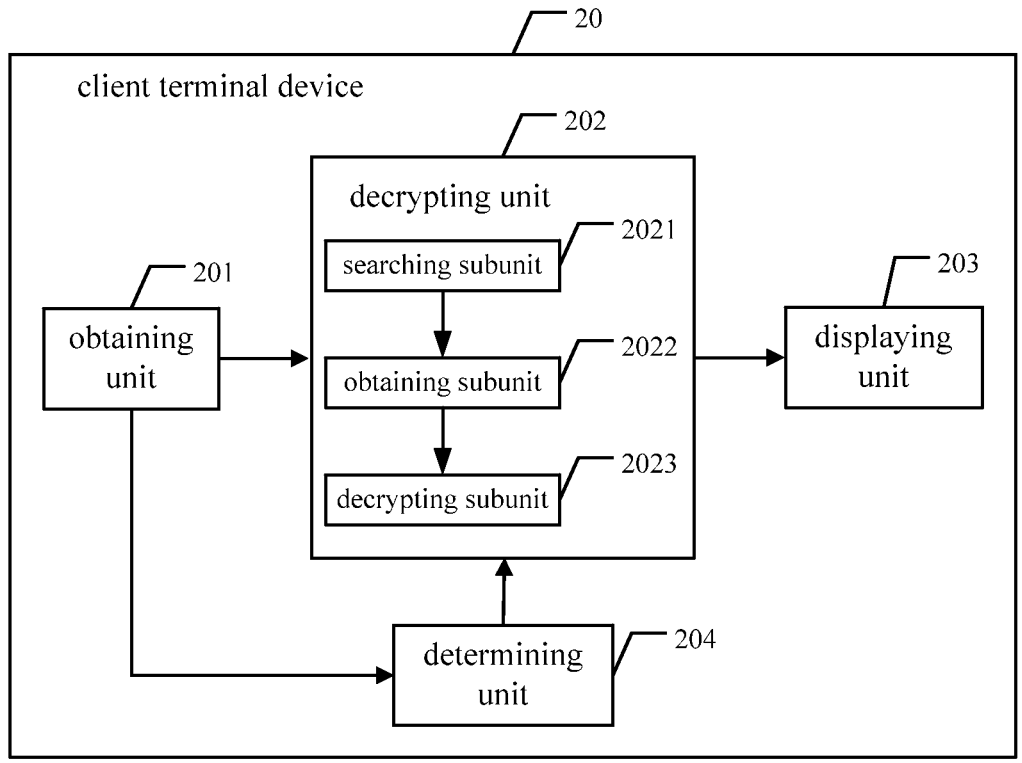
FIG. 5 is a schematic diagram illustrating a client terminal device for verifying page information based on another example of the present disclosure.

Based on the example of the client terminal device shown in FIG. 4, in another example of the client terminal device of the present disclosure, the verification decryption information includes a URL, a name of a signature field of page content, a storage location of the signature field and a public key which is used to decrypt a signature, of each of pages to be verified. FIG. 5 is a schematic diagram illustrating a client terminal device for verifying page information based on another example of the present disclosure. As shown in FIG. 5, the decrypting unit 202 may include a searching subunit 2021, an obtaining subunit 2022 and a decrypting subunit 2023.

The searching subunit 2021 is configured to, according to the URL of the page to be browsed by the user, search for the name of the signature field, the storage location of the signature field and the public key for decrypting a signature, of the page to be browsed by the user.

The obtaining subunit 2022 is configured to obtain a signature corresponding to the name of the signature field from the storage location of the signature field searched out by the searching subunit 2021.

The decrypting subunit 2023 is configured to decrypt the signature obtained by the obtaining subunit 2022 using the public key searched out by the searching subunit 2021, and obtain real verification information of the page to be browsed by the user.

Figure 6:
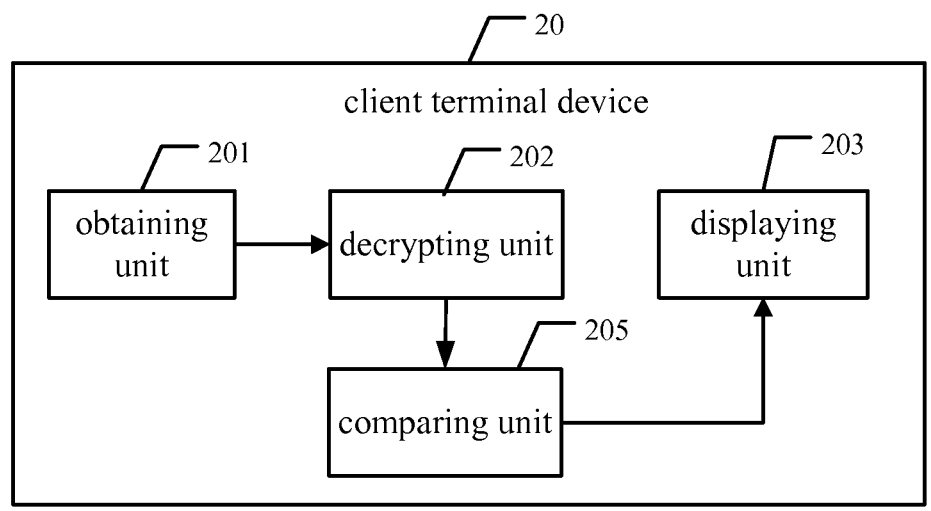
FIG. 6 is a schematic diagram illustrating a client terminal device for verifying page information based on another example of the present disclosure.

Based on the example of the client terminal device shown in FIG. 3, another example of the client terminal device of the present disclosure is shown in FIG. 6, and the client terminal device shown in FIG. 6 may further include a comparing unit 205.

The comparing unit 205 is configured to compare the real verification information of the page to be browsed by the user with the actual verification information of the page to be browsed by the user.

Figure 7:
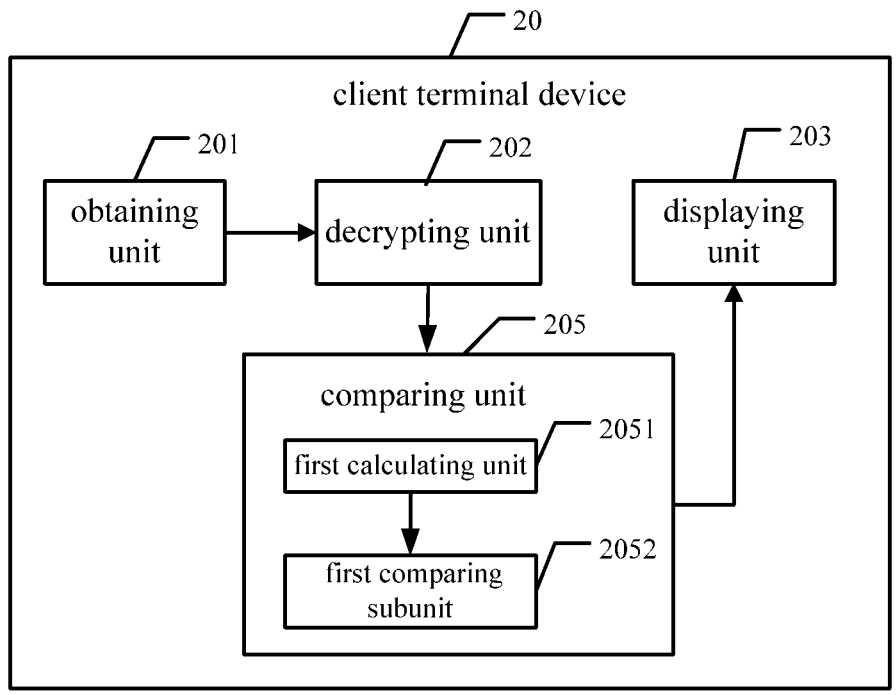
FIG. 7 is a schematic diagram illustrating a client terminal device for verifying page information based on another example of the present disclosure.

Based on the example of the client terminal device shown in FIG. 6, in another example of the client terminal device of the present disclosure, the real verification information includes a real hash value of page content of the page to be browsed by the user. FIG. 7 is a schematic diagram illustrating a client terminal device for verifying page information based on another example of the present disclosure. As shown in FIG. 7, the comparing unit 205 may include a first calculating subunit 2051 and a first comparing subunit 2052.

The first calculating subunit 2051 is configured to calculate an actual hash value of page content of the page to be browsed by the user.

The first comparing subunit 2052 is configured to compare the real hash value of page content of the page to be browsed by the user with the actual hash value, calculated by the first calculating subunit 2051, of page content of the page to be browsed by the user.

Figure 8:
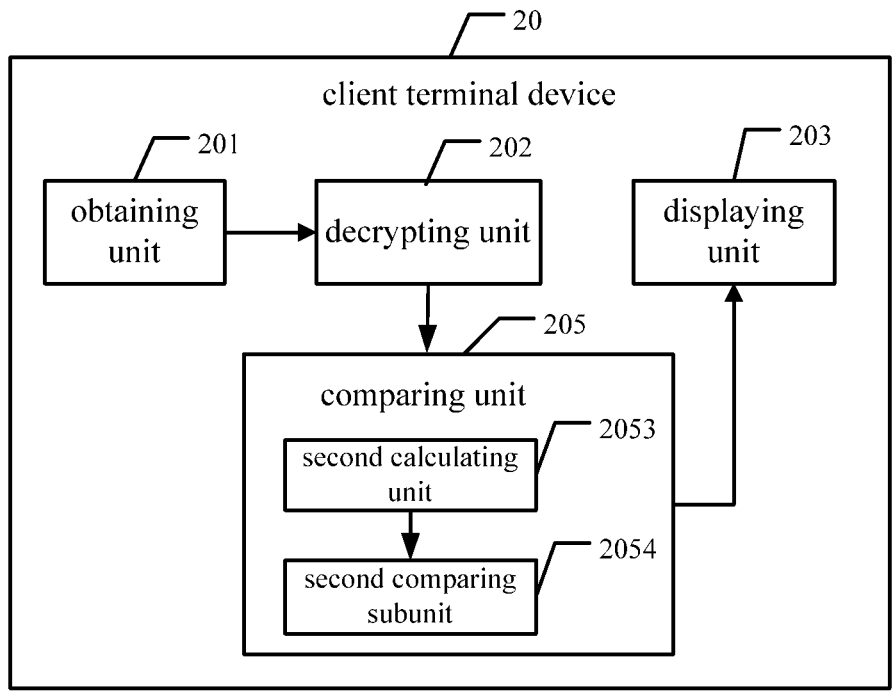
FIG. 8 is a schematic diagram illustrating a client terminal device for verifying page information based on another example of the present disclosure.

Based on the example of the client terminal device shown in FIG. 6, in another example of the client terminal device of the present disclosure, the real verification information includes a real hash value of compressed page content of the page to be browsed by the user. FIG. 8 is a schematic diagram illustrating a client terminal device for verifying page information based on another example of the present disclosure. As shown in FIG. 8, the comparing unit 205 may include a second calculating subunit 2053 and a second comparing subunit 2054.

The second calculating subunit 2053 is configured to calculate an actual hash value of compressed page content of the page to be browsed by the user.

The second comparing subunit 2054 is configured to compare the real hash value of compressed page content of the page to be browsed by the user with the actual hash value of compressed page content of the page to be browsed by the user calculated by the first calculating subunit 2053.

Based on above mentioned examples of the client terminal device, in another example of the client terminal device of the present disclosure, the displaying unit 206 may be further configured to display a security prompt when the real verification information of the page to be browsed by the user is the same as the actual verification information of the page to be browsed by the user.

Figure 9:
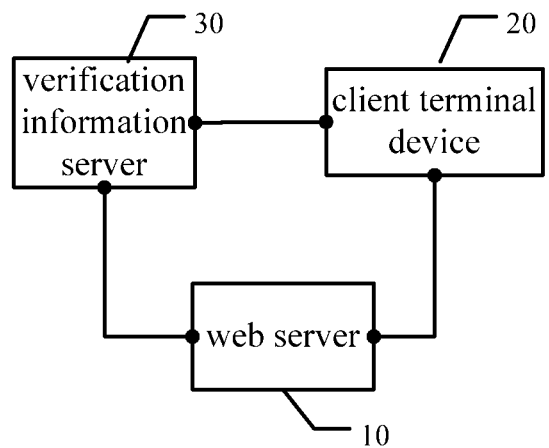
FIG. 9 is a schematic diagram illustrating a system for verifying page information based on an example of the present disclosure.

FIG. 9 is a schematic diagram illustrating a system for verifying page information based on an example of the present disclosure. As shown in FIG. 9, the system may include a web server 10, a verification information server 30 and a client terminal device 20.

The web server 10 is configured to generate verification decryption information of real verification information of each of pages to be verified.

The verification information server 30 is configured to obtain verification decryption information of real verification information of each of pages to be verified from the web server 10, and store obtained verification decryption information of real verification information of each of pages to be verified.

The client terminal device 20 is configured to obtain the verification decryption information of real verification information of each of pages to be verified from the verification information server 30, obtain real verification information of a page, which is to be browsed by a user and obtained from the web server 10, by decrypting the verification decryption information; when the real verification information of the page to be browsed by the user differs from actual verification information of the page to be browsed by the user, display risk warning information.

In the example of the present disclosure, the client terminal device 20 may be any one of the client terminal devices shown in FIGS. 3 to 8, and implement the operations of any one of the client terminal devices described accompanying with FIGS. 3 to 8.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure. The non-transitory storage medium includes a hard disk, a floppy disk, a magnetic disk, a compact disk (e.g., CD-ROM, CD-R, CD-RW, DVD-ROM, DVD-RAM, DVD-RW and DVD+RW), a tape, a Flash card, ROM, and so on. Optionally, it is possible to download the program codes from a server computer via a communication network.

Figure 10:
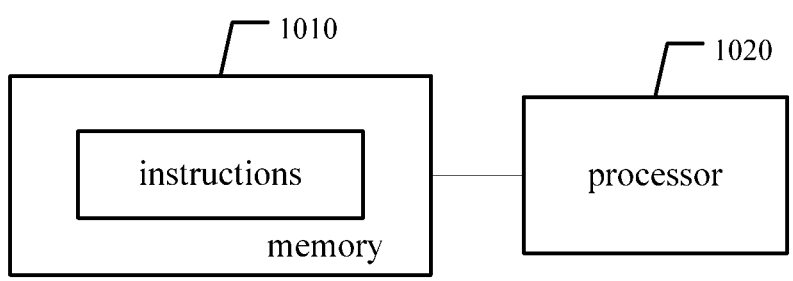
FIG. 10 is a schematic diagram illustrating a client terminal device for verifying page information based on an example of the present disclosure.

For example, FIG. 10 is a schematic diagram illustrating another structure of the client terminal device for verifying page information based on an example of the present disclosure. As shown in FIG. 10, the client terminal device may include a memory 1010 and a processor 1020 in communication with the memory 1010.

The memory 1010 may store a group of instructions which may be executed by the processor 1020 to implement the operations of units of any one of the client terminal devices shown in FIGS. 3 to 8.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A method for verifying page information, comprising:
   obtaining, by a user terminal, verification decryption information of real verification information of each of pages to be verified from a verification information server; wherein the verification decryption information of real verification information of each of pages to be verified is sent by at least one web server to the verification information server;
   obtaining, by the user terminal, real verification information of a page to be browsed by a user by decrypting the verification decryption information; wherein the page to be browsed by the user is obtained from a web server; and
   displaying, by the user terminal, risk warning information when the real verification information of the page to be browsed by the user differs from actual verification information of the page to be browsed by the user;
   wherein the real verification information of the page is generated based on the page located at the web server, and the actual verification information of the page is generated based on the page obtained by the user terminal.

2. The method according to claim 1, further comprising:
   determining that the page to be browsed by the user is a page to be verified.

3. The method according to claim 2, wherein the verification decryption information comprises URLs of all pages to be verified; and wherein determining that the page to be browsed by the user is a page to be verified comprises:
   searching the URLs of all pages to be verified for a URL of the page to be browsed by the user; and
   determining that the page to be browsed by the user is a page to be verified when the URL of the page to be browsed by the user is searched out.

4. The method according to claim 3, wherein the verification decryption information further comprises: a name of a signature field of page content, a storage location of the signature field and a public key for decrypting a signature, of each of the pages to be verified; and wherein obtaining the real verification information of the page to be browsed by the user by decrypting the verification decryption information comprises:
  searching for a name of a signature field, a storage location of the signature field and a public key according to the URL of the page to be browsed by the user;
  obtaining a signature corresponding to the name of the signature field from the storage location of the signature field;
  decrypting the signature using the public key, and obtaining the real verification information of the page to be browsed by the user.

5. The method according to claim 1, further comprising: comparing the real verification information of the page to be browsed by the user with the actual verification information of the page to be browsed by the user.

6. The method according to claim 5, wherein the real verification information comprises a real hash value of page content of the page to be browsed by the user; and wherein comparing the real verification information of the page to be browsed by the user with the actual verification information of the page to be browsed by the user comprises:
  calculating an actual hash value of the page content of the page to be browsed by the user; and
  comparing the real hash value of the page content of the page to be browsed by the user with the actual hash value of the page content of the page to be browsed by the user.

7. The method according to claim 5, wherein the real verification information comprises a real hash value of compressed page content of the page to be browsed by the user; and wherein comparing the real verification information of the page to be browsed by the user with actual verification information of the page to be browsed by the user comprises:
  calculating an actual hash value of the compressed page content of the page to be browsed by the user; and
  comparing the real hash value of the compressed page content of the page to be browsed by the user with the actual hash value of the compressed page content of the page to be browsed by the user
  wherein the real hash value is generated based on the compressed page content of the page located at the web server, and the actual hash value is generated based on the compressed page content of the page obtained by the user terminal.

8. The method according to claim 1, further comprising: displaying a security prompt when the real verification information of the page to be browsed by the user is the same as the actual verification information of the page to be browsed by the user.

9. A client terminal device for verifying page information, comprising: a memory and a processor in communication with the memory;
  wherein the memory comprises:
    an obtaining unit, configured to obtain verification decryption information of real verification information of each of pages to be verified from a verification information server; wherein the verification decryption information of real verification information of each of pages to be verified is sent by at least one web server to the verification information server;
    a decrypting unit, configured to obtain real verification information of a page to be browsed by a user by decrypting the verification decryption information obtained by the obtaining unit; wherein the page to be browsed by the user is obtained from a web server; and
    a displaying unit, configured to display risk warning information when the real verification information, obtained by the decrypting unit, of the page to be browsed by the user differs from actual verification information of the page to be browsed by the user;
    wherein the real verification information of the page is generated based on the page located at the web server, and the actual verification information of the page is generated based on the page obtained by the user terminal.

10. The client terminal device according to claim 9, wherein the memory further comprises:
  a determining unit, configured to, before the decrypting unit obtains the real verification information of the page to be browsed by the user, determine that the page to be browsed by the user is a page to be verified.

11. The client terminal device according to claim 10, wherein the verification decryption information comprises URLs of all pages to be verified;
  the determining unit is configured to search the URLs of all pages to be verified for a URL of the page to be browsed by the user; when the URL of the page to be browsed by the user is searched out, determine that the page to be browsed by the user is a page to be verified.

12. The client terminal device according to claim 11, wherein the verification decryption information further comprises: a name of a signature field of page content, a storage location of the signature field and a public key for decrypting a signature, of each of the pages to be verified; and wherein the decrypting unit comprises:
  a searching subunit, configured to, according to the URL of the page to be browsed by the user, search for a name of a signature field, a storage location of the signature field and a public key for decrypting a signature, of the page to be browsed by the user;
  an obtaining subunit, configured to obtain a signature corresponding to the name of the signature field from the storage location of the signature field searched out by the searching subunit; and
  a decrypting subunit, configured to decrypt the signature, obtained by the obtaining subunit, using the public key searched out by the searching subunit, and obtain the real verification information of the page to be browsed by the user.

13. The client terminal device according to claim 9, wherein the memory further comprises:
  a comparing unit, configured to compare the real verification information of the page to be browsed by the user with the actual verification information of the page to be browsed by the user.

14. The client terminal device according to claim 13, wherein the real verification information includes a real hash value of page content of the page to be browsed by the user; and wherein the comparing unit comprises:
  a first calculating subunit, configured to calculate an actual hash value of the page content of the page to be browsed by the user; and
  a first comparing subunit, configured to compare the real hash value of the page content of the page to be browsed by the user with the actual hash value of the page content of the page to be browsed by the user;
  wherein the real hash value is generated based on the compressed page content of the page located at the web server, and the actual hash value is generated based on the compressed page content of the page obtained by the user terminal.

15. The client terminal device according to claim 13, wherein the real verification information includes a real hash value of compressed page content of the page to be browsed by the user; and wherein the comparing unit comprises:
- a second calculating subunit, configured to calculate an actual hash value of the compressed page content of the page to be browsed by the user; and
- a second comparing subunit, configured to compare the real hash value of the compressed page content of the page to be browsed by the user with the actual hash value of the compressed page content of the page to be browsed by the user.

16. The client terminal device according to claim 9, wherein
- the displaying unit is further configured to display a security prompt when the real verification information of the page to be browsed by the user is the same as the actual verification information of the page to be browsed by the user.

17. A system for verifying page information, comprising:
- a web server, configured to generate verification decryption information of real verification information of each of pages to be verified;
- a verification information server, configured to obtain the verification decryption information of the real verification information of each of the pages to be verified from the web server, and store obtained verification decryption information of the real verification information of each of the pages to be verified; and
- a client terminal, configured to obtain the verification decryption information of the real verification information of each of the pages to be verified from the verification information server; obtain real verification information of a page to be browsed by a user by decrypting the verification decryption information; display risk warning information when the real verification information of the page to be browsed by the user differs from actual verification information of the page to be browsed by the user; wherein the page to be browsed by the user is obtained from the web server;
- wherein the real verification information of the page is generated based on the page located at the web server, and the actual verification information of the page is generated based on the page obtained by the user terminal.

* * * * *